(12) United States Patent
Younis

(10) Patent No.: US 9,016,124 B1
(45) Date of Patent: Apr. 28, 2015

(54) MEMS SWITCH TRIGGERED BY SHOCK AND/OR ACCELERATION

(75) Inventor: Mohammad I. Younis, Johnson City, NY (US)

(73) Assignee: The Research Foundation for The State University of New York, Binghamton, NY (US)

( * ) Notice: Subject to any disclaimer, the term of this patent is extended or adjusted under 35 U.S.C. 154(b) by 315 days.

(21) Appl. No.: 13/602,456

(22) Filed: Sep. 4, 2012

Related U.S. Application Data

(63) Continuation of application No. 12/371,535, filed on Feb. 13, 2009, now Pat. No. 8,256,291, which is a continuation of application No. 11/448,413, filed on Jun. 7, 2006, now Pat. No. 7,493,815.

(51) Int. Cl.
*G01P 15/04* (2006.01)
*G01P 15/08* (2006.01)

(52) U.S. Cl.
CPC ......... *G01P 15/04* (2013.01); *G01P 2015/0862* (2013.01)

(58) Field of Classification Search
USPC ........................................ 73/514.16; 257/415
See application file for complete search history.

(56) References Cited

U.S. PATENT DOCUMENTS

| | | | |
|---|---|---|---|
| 5,353,641 A * | 10/1994 | Tang | 73/514.18 |
| 6,388,299 B1 * | 5/2002 | Kang et al. | 257/415 |
| 6,388,300 B1 * | 5/2002 | Kano et al. | 257/419 |
| 6,891,454 B1 * | 5/2005 | Naito et al. | 335/78 |
| 7,412,358 B2 * | 8/2008 | Bochobza-Degani et al. | 703/2 |
| 7,493,815 B1 * | 2/2009 | Younis | 73/514.16 |
| 7,667,559 B2 * | 2/2010 | Yamanaka et al. | 335/78 |
| 7,978,034 B2 * | 7/2011 | Naito et al. | 335/78 |
| 8,168,120 B1 * | 5/2012 | Younis | 422/82.01 |
| 8,256,291 B1 * | 9/2012 | Younis | 73/514.16 |
| 8,501,097 B1 * | 8/2013 | Younis | 422/82.01 |
| 2002/0008296 A1 * | 1/2002 | Chan et al. | 257/415 |
| 2005/0162244 A1 * | 7/2005 | Naito et al. | 335/78 |
| 2006/0202933 A1 * | 9/2006 | Pasch et al. | 345/94 |
| 2011/0317325 A1 * | 12/2011 | Espinosa et al. | 361/211 |
| 2012/0217171 A1 * | 8/2012 | Wurzinger et al. | 205/775 |

* cited by examiner

*Primary Examiner* — Evan Pert
(74) *Attorney, Agent, or Firm* — Steven M. Hoffberg; Ostrolenk Faber LLP

(57) ABSTRACT

An acceleration-triggered or shock-triggered, smart, tunable MEMS switch that may function as both a classic accelerometer and an acceleration threshold detector. A parallel element MEMS device has a stationary and a movable element forming a capacitor. Varying acceleration moves the movable member with respect to the stationary member, thereby changing the capacitance of the device. The capacitance varying may be used, in cooperation with appropriate circuitry, to provide a signal representative of instantaneous acceleration. By applying a biasing voltage, the movable element may be positioned in a predetermined fashion such that acceleration of a predetermined magnitude causes the movable element to pull in (snap down). The movable and stationary elements may function as a switch such that when the predetermined acceleration or shock level occurs, electrodes close, a current flows between the elements so that an external device such as an air bag may be activated.

20 Claims, 21 Drawing Sheets

MEMS SWITCH TRIGGERED BY SHOCK AND/OR ACCELERATION

CROSS REFERENCE TO RELATED APPLICATION

The present application is a Continuation of U.S. patent application Ser. No. 12/371,535, filed Feb. 13, 2009, now U.S. Pat. No. 8,256,291, issued Sep. 4, 2012, which is a continuation of U.S. Ser. No. 11/448,413, filed Jun. 7, 2006, now U.S. Pat. No. 7,493,815, issued Feb. 24, 2009, the entirety of which are expressly incorporated herein by reference.

FIELD OF THE INVENTION

The invention pertains to acceleration sensors and, more particularly, to a MEMS switch triggered by acceleration or mechanical shock.

BACKGROUND OF THE INVENTION

Accelerometers are devices that provide an electrical signal output related to an acceleration level to which the accelerometer is subjected. Accelerometers are useful for numerous applications such as inertial navigation where continuous readings related to instantaneous acceleration are required.

Many types of accelerometers are known in the prior art; however, many prior art accelerometers suffer from one or more problems. They may be bulky, expensive, and/or may require elaborate support circuitry to provide their output signals.

While many accelerometer applications require an ongoing acceleration level from their associated accelerometers, other applications detect when a predetermined acceleration threshold has been reached. Such applications also may be satisfied by acceleration or shock-sensing switches that trigger (i.e., open, close, or otherwise signal) that a predetermined shock has occurred or an acceleration level has been reached.

A well-known example of a threshold detecting accelerometer relates to deploying motor vehicle air bags during a collision. While instantaneous acceleration levels of the vehicle may be useful for applications unrelated to air bag deployment, for that particular application only detection of an exceeded acceleration value due to external acceleration (i.e., not due to external forces or pressures), is required. Heretofore, elaborate systems have been required for detecting the acceleration and then deploying one or more air bags. Such systems generally require an accelerometer, amplification and/or other processing circuitry, a comparator circuit, and finally a switch to actually deploy the air bags. Such systems are relatively expensive and typically require many support components. This provides unnecessary opportunities for component failure resulting in less than optimally reliable systems.

DISCUSSION OF THE RELATED ART

Several capacitance-based accelerometers are known in the prior art. For example, U.S. Pat. No. 6,388,300 for SENSOR ASSEMBLY AND METHOD, issued May 14, 2002 to Joon-Won Kang et al. provides a device wherein a diaphragm, forming one side of a capacitor, is snapped down due to the effect of external forces/pressure plus the electrostatic forces acting on the diaphragm. The KANO et al. apparatus relies on a static instability. Static non-time-varying forces are the cause of the snapping down. In the device of the present invention, operation is based upon dynamic, not static instability.

United States Published Patent Application No. 2002/0008296 for INTEGRATED SENSOR HAVING PLURALITY OF RELEASED BEAMS FOR SENSING ACCELERATION AND ASSOCIATED METHODS, published Jan. 24, 2003 upon application by Tsiu Chiu Chan et al. teaches an acceleration-sensing structure. The CHAN et al. apparatus use multiple beams, each designed to operate within its own specific range of acceleration values to detect a wide range of accelerations. The CHAN et al. apparatus has no switch function but is merely an acceleration sensor. The apparatus of the present invention uses a single beam/structure to detect a wide range of accelerations.

In addition, CHAN et al. fail to provide an electrostatic biasing force and, consequently, there is no mechanism to provide a sudden snap down of a movable portion of the structure in response to a predetermined level acceleration as is provided in the device of the present invention.

U.S. Pat. No. 6,388,300 for SEMICONDUCTOR PHYSICAL QUANTITY SENSOR AND METHOD OF MANUFACTURING SAME, issued May 14, 2002 to Kazuhiko Kano et al. provides another device absent a dynamic instability-based pull-in function. KANO et al. provide no parallel plate mechanism.

It would, therefore, be advantageous to provide an inexpensive, reliable, calibrateable, accelerometer providing both a continuous signal representative of instantaneous acceleration as well as a direct signal indicating that an acceleration limit has been reached.

SUMMARY OF THE INVENTION

In accordance with the present invention there is provided an acceleration or shock-triggered smart MEMS switch that may function as both a classic accelerometer and as an acceleration threshold detector. A MEMS device having parallel elements has both a stationary and a movable element forming a capacitor. Variation in acceleration causes movement of the movable member with respect to the stationary member, thereby changing the capacitance of the device. The variation in capacitance is used to provide a signal representative of instantaneous acceleration. An electrostatic force, provided by a bias voltage, typically but not necessarily a DC voltage, applied across the stationary and movable elements positions the movable element in a predetermined relation to the stationary element such that acceleration of a predetermined magnitude causes the movable element to pull in (i.e., snap down). When snap down occurs, the stationary and movable elements are in physical contact with one another and the combination may, therefore, function as a switch. That is, when a predetermined acceleration is experienced a current flows through the elements and an external device, for example, an air bag may be electrically activated.

It is, therefore, an object of the invention to provide an acceleration-triggered smart MEMS switch that may also function as an accelerometer.

It is another object of the invention to provide an acceleration-triggered smart MEMS switch that functions as an accelerometer that may be calibrated to provide a contact closure at a predetermined acceleration or mechanical shock threshold.

It is an additional object of the invention to provide an acceleration-triggered smart MEMS switch that functions as an accelerometer that may be calibrated by applying a bias voltage across a stationary and a movable element of the device.

It is a further object of the invention to provide an acceleration-triggered smart MEMS switch that is inexpensive to fabricate.

It is a further object of the invention to provide an acceleration-triggered smart MEMS switch that requires no additional circuitry to perform the function of an acceleration threshold detector.

It is yet another object of the invention to provide an acceleration-triggered smart MEMS switch that consumes only small amounts of electrical power.

It is a still further object of the invention to provide an acceleration-triggered smart MEMS switch that may be designed to be insensitive to varying damping conditions.

It is another object of the invention to provide an acceleration-triggered smart MEMS switch that may be designed to be sensitive to mechanical shock.

It is an additional object of the invention to provide an acceleration-triggered smart MEMS switch that is relatively insensitive to noise.

It is a yet another object of the invention to provide an acceleration-triggered smart MEMS switch that produces a clear, strong signal (i.e., indication) when activated by an acceleration in excess of the calibrated threshold acceleration.

It is a still further object of the invention to provide an acceleration-triggered smart MEMS switch having a self-test or self-monitoring feature.

BRIEF DESCRIPTION OF THE DRAWINGS

A complete understanding of the present invention may be obtained by reference to the accompanying drawings, when considered in conjunction with the subsequent, detailed description, in which.

DETAILED DESCRIPTION OF THE PREFERRED EMBODIMENT

Figure 1:
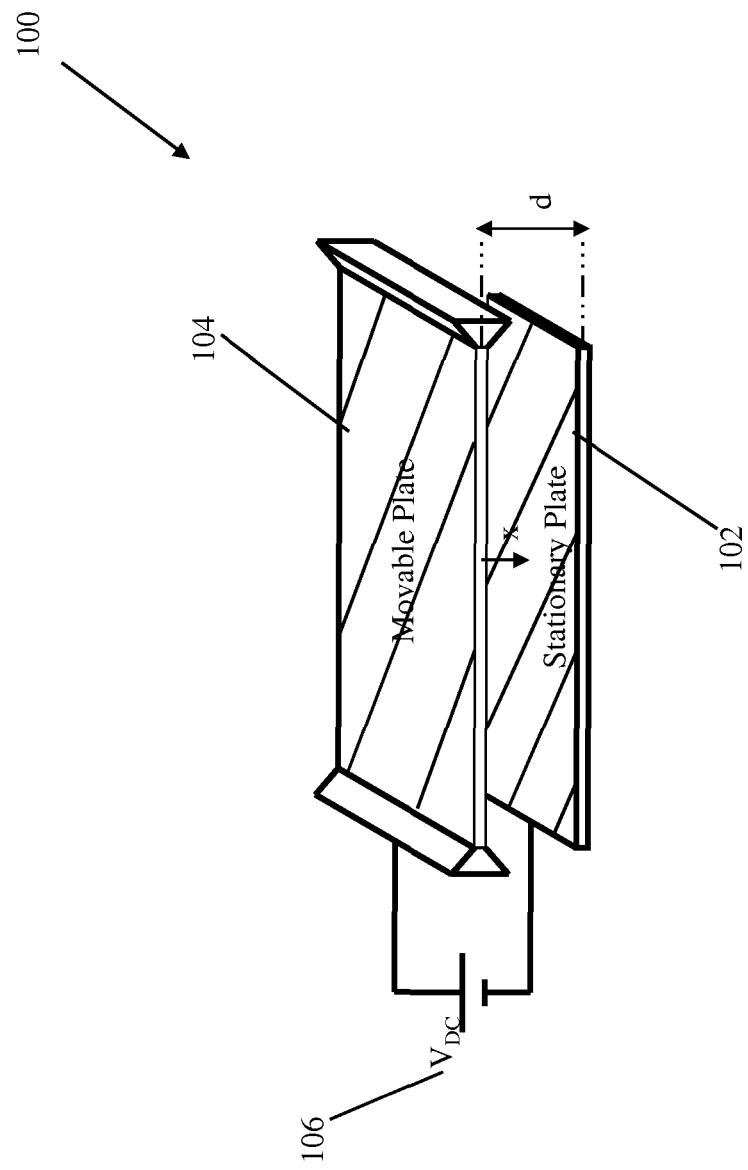
FIG. 1 is a schematic, perspective view of a parallel plate capacitor.

Many micro-electro-mechanical system (MEMS) devices utilize a parallel plate capacitor consisting of a first, stationary plate and a movable element, for example, a plate that may be actuated or biased by an electrostatic DC force. As used herein, the term plate includes plates, beams, shells, diaphragms and other such structures suitable for forming a movable element in a MEMS. Referring first to FIG. 1 there is shown a perspective view of such an arrangement, generally at reference number 100. A movable plate 104 may be deflected relative to a stationary plate 102 by an applied DC bias voltage 106.

Figure 2B:
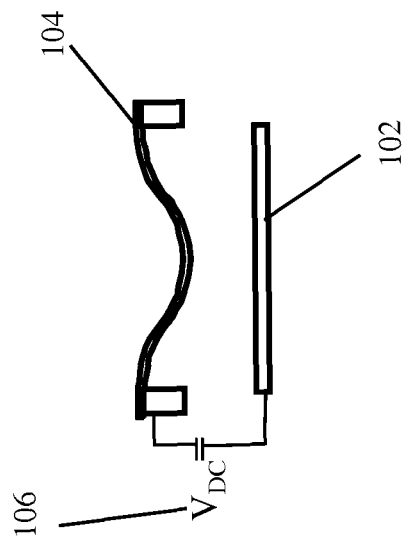
FIG. 2b is a side, schematic view of the parallel plate capacitor of FIG. 1 in a slightly deflected state.
Figure 2A:
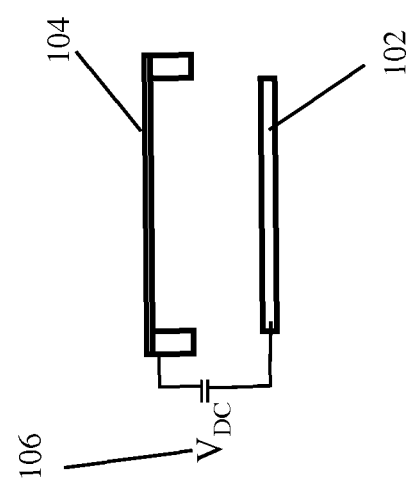
FIG. 2a is a side, schematic view of the parallel plate capacitor of FIG. 1 in an undeflected state.

Referring now to FIGS. 2a and 2b there are shown side, cross-sectional schematic views of the capacitor of FIG. 1 in an undeflected and a slightly deflected state, respectively. In FIG. 2a, little or no DC bias voltage 106 is applied between stationary plate 102 and movable plate 104. $V_{DC}$ 106 is approximately 0. However, in FIG. 2b, a small DC bias voltage 106 is applied between fixed plate 102 and movable plate 104.

The electrostatic force created by DC bias voltage 106 slightly deflects movable plate 104 toward stationary plate 102. If the electrostatic force is small, the elastic restoring force of movable plate 104 is in equilibrium with the opposing, applied electrostatic force and movable plate 104 stays in the deflected position. While a DC voltage is shown for purposes of disclosure, an AC voltage, not shown, may also be used. For example, an AC voltage may be used to enhance the sensitivity of the inventive MEMS switch 110. The use of an AC bias voltage is known to those of skill in the art and is not further described herein.

Figures 3A, 3B:
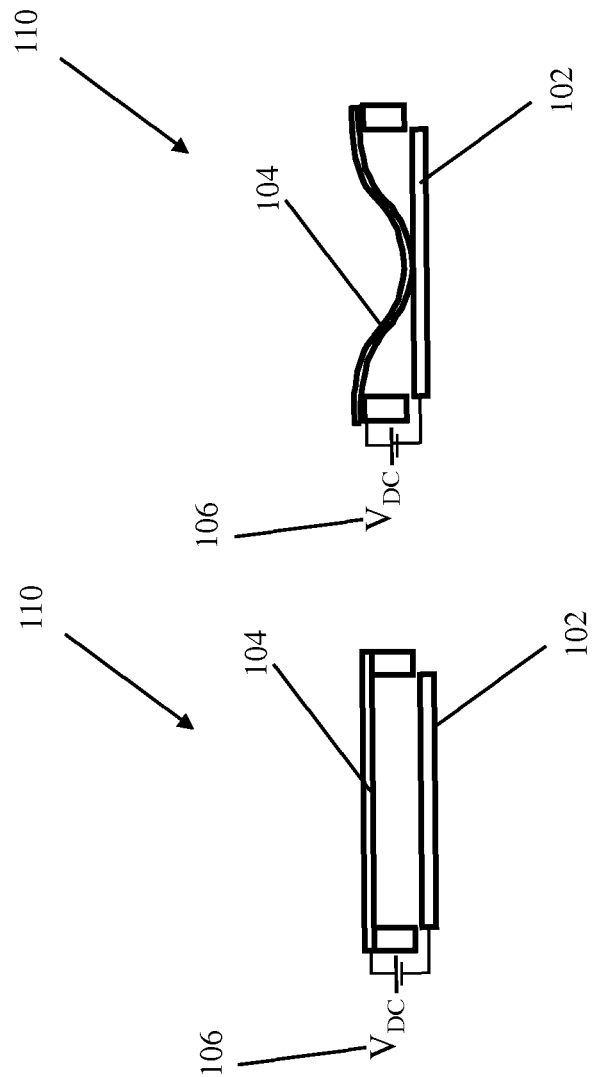
FIG. 3a is a side, schematic view of the parallel plate capacitor of FIG. 1 in an undeflected state.
FIG. 3b is a side, schematic view of the parallel plate capacitor of FIG. 1 in pulled-in state.

Referring now to FIGS. 3a and 3b, there are shown side, cross-sectional schematic views of the capacitor of FIG. 1 in an undeflected and a collapsed state, respectively. As is typical in a MEMS switch application, as the DC bias voltage 106 increases, the electrostatic force between plates 102, 104 increases, resulting in increased deflection of movable plate 104. There is an upper limit for the DC bias voltage 106', beyond which the mechanical restoring force of movable plate 104 can no longer resist or overcome the applied, opposing electrostatic force. This leads to a sudden collapse of movable plate 104, which typically impacts stationary plate as shown in FIG. 3b. This structural instability phenomenon is known as pull-in or snap down.

Structures such as those shown in FIGS. 2a, 2b, 3a, and 3b may be used to create MEMS accelerometers and switches. In such accelerometers, movable plate 104 is biased by a small DC bias voltage 106. If the deflected movable plate 104 as seen in FIG. 2b experiences a downward acceleration, it deflects further in accordance with Newton's second law: F=ma. Consequently, the acceleration exerts a force on movable plate 104. This deflection changes the capacitance of the capacitor formed by plates 102, 104, the capacitance change being related to the magnitude of acceleration experienced by movable plate 104.

MEMS accelerometers are designed to operate away from the pull-in instability (FIG. 3b); otherwise movable plate 104 collapses into stationary plate 102 and the accelerometer fails. However, devices known as MEMS switches 110 depend on the pull-in phenomenon to operate. In MEMS switches (FIGS. 3a, 3b) the movable plate 104 is actuated by large DC bias voltage 106'. Movable plate 104 is deliberately deflected beyond pull-in to snap it down in a large stroke (relative to the small deflection of the structure due to electrostatic force when it is in equilibrium state) within a short time. For example, the deflection of movable plate 104 when it is in the equilibrium with the electrostatic force reaches a maximum value of approximately 30-45% of the gap width. However, when movable plate 104 collapses, there is no equilibrium and movable plate 104 rapidly moves the total gap distance.

When movable plate 104 is unactuated (FIG. 3a), the MEMS switch 110 is in a normally open (n.o.) or "off" position. However, when movable plate 104 is actuated and impacts stationary plate 102 (FIG. 3b), the switch is in a closed, "on" position. It will be recognized, however, that MEMS switches in accordance with the present invention may be configured as normally closed (n.c.) devices wherein current flows before activation. Activation by shock or acceleration then opens the switch thereby interrupting current flow. Of course it will be recognized that to function as an electrical switch, appropriate conductors, not shown, must be electrically connected to fixed plate 102 and movable plate 104.

MEMS switches may also be mechanical. The motion of movable plate 104 upon pull-in may be utilized to perform a mechanical function. Such mechanical functions are well known to those of skill in the art and are not described herein.

The MEMS switch 110 triggered by shock and/or acceleration of the present invention combines characteristics of both a traditional accelerometer (FIGS. 2a, 2b) and a MEMS switch (FIGS. 3a, 3b). In the inventive configuration, a parallel plate capacitor as shown in FIG. 2b is utilized. Movable plate 104 is only slightly deflected by an applied DC bias voltage 106 to a point below the instability limit (i.e., pull-in). However, as discussed hereinabove, when subjected at a downward acceleration, movable plate 104 is further deflected toward stationary plate 102.

When the MEMS switch 110 functions both as an accelerometer and a switch, movable plate 104 remains deflected as long as the applied acceleration remains, assuming the acceleration is less than the designed collapse point of the device 110. This deflection can be detected by the change of capacitance. When the acceleration ceases, movable plate 104 returns to its original position. If a new acceleration occurs, again assuming that the acceleration is less than the designed switching level, movable plate 104 is again deflected, indicating a new acceleration level. Consequently, the switch 110 monitors and records the acceleration, but does not actuate. This allows implementation of a "self test" to check that the MEMS switch 110 is properly functioning. This feature is desirable in many applications where it is important to confirm that the MEMS switch 110 is still properly functioning. For example, while instantaneous acceleration may be of no particular interest in an application such as air bag deployment, a varying signal responsive to changing acceleration from the switch can assure a monitoring circuit that the MEMS switch 110 is, indeed, functional. Once the design acceleration collapse level is experienced by the MEMS switch 110, movable plate 104, however, remains in this pulled in, collapsed position.

Novel accelerometer structures, of course, may be designed to operate within predetermined ranges of acceleration. However, if an accelerometer is subjected to an acceleration beyond its upper design limit, movable plate 104 deflects excessively. Due to this deflection, as the electrostatic force is proportional to the inverse of the distance (d) squared between the two plates 102, 104, the electrostatic force becomes very large. Consequently, the electrostatic force overcomes the restoring force of movable plate 104 leading to its collapse (pull-in).

Pull-in occurs as a result of two factors: the electrostatic force and the acceleration of the plate 104. It should be noted that if movable plate 104 were not biased by a DC voltage 106, movable plate 104 would deflect only slightly due to the acceleration to which it is subjected and would not collapse. Likewise, if movable plate 104 is biased by a small DC voltage 106 and not subjected to acceleration, movable plate 104 again deflects slightly but does not collapse. However, the additive result of the electrostatic force imposed by the DC bias voltage 106' and the acceleration causes movable plate 104 to collapses or pull in. In other words, the pull-in threshold is determined not only by the DC bias voltage 106', but by the level of acceleration on movable plate 104.

Figure 4A:
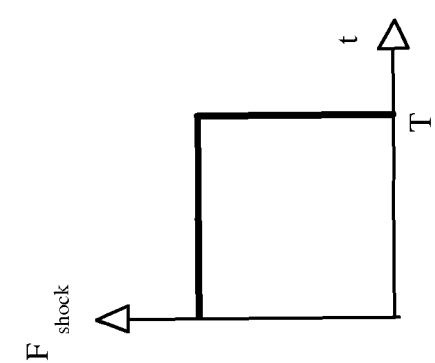
FIGS. 4a-4c are magnitude vs. time plots of simple rectangular, sinusoidal, and triangular shock pulses, respectively.
Figure 4B:
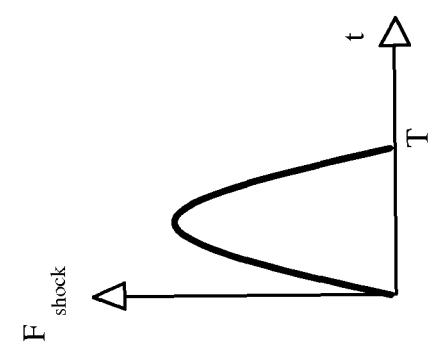
Figure 4C:
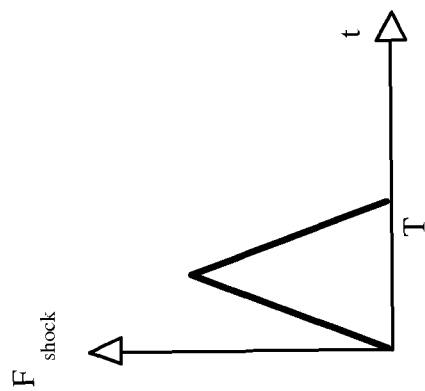

Structures can be subjected to large forces applied suddenly and over a short period of time. These forces are known as mechanical shocks or impacts. A shock pulse is characterized by its maximum amplitude, its duration, and its amplitude over time shape. Referring now to FIGS. 4a-4c there are shown graphs of force vs. time of three shock pulses that approximate actual shock load profiles. FIGS. 4a-4c are a rectangular pulse, a half-sine pulse, and a triangular pulse, respectively.

Figure 20:
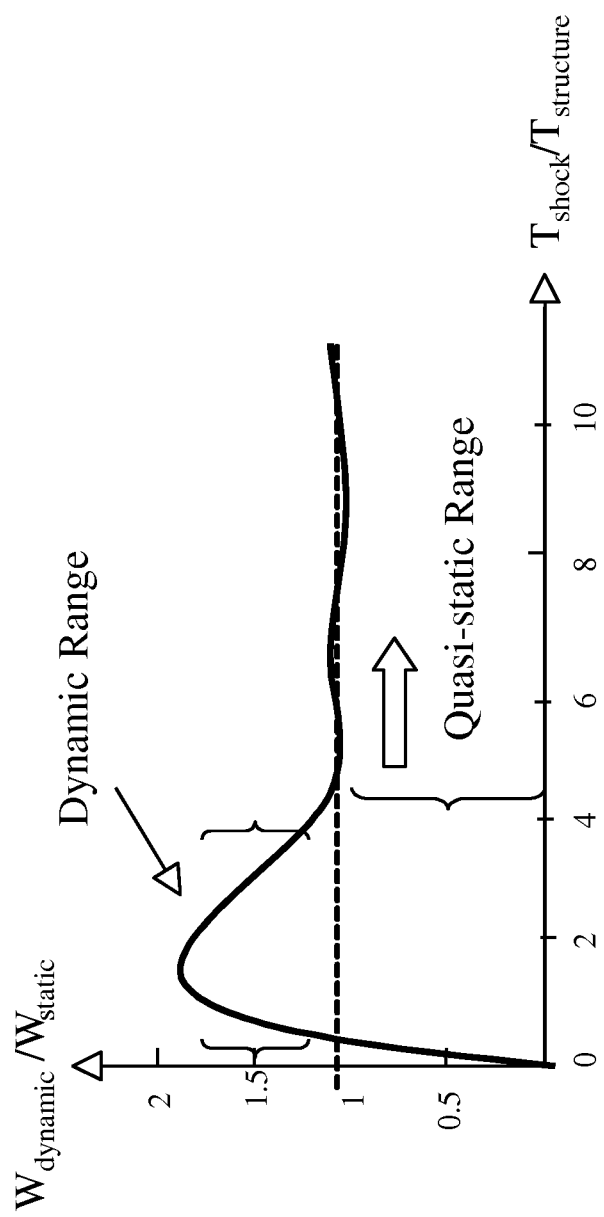
FIG. 20 is a plot showing the variation of the ratio $D_{ynamic}/W_{static}$ is plotted for various values of the ratio $T_{shock}/T_{structure}$.

When a microstructure is subjected to a mechanical shock, it can experience the shock load as a quasi-static load varying slowly over time. This occurs if the microstructure has a large natural frequency (resonance frequency). Hence, its natural period $T_{structure}$ (the inverse of frequency) becomes small compared to the duration of the shock pulse $T_{shock}$. Notice here that to the "big" world (i.e., non-microstructure devices), the shock is still a sudden force acts over a short period of time. However, this is not what the microstructure experiences. A microstructure experiences the shock as a slow force (quasi-static force). Therefore, the response of the microstructure in this case to the shock force ($W_{dynamic}$) is close to its response to an equivalent static force ($W_{static}$). In FIG. 20, the variation of the ratio $W_{dynamic}/W_{static}$ is plotted for various values of the ratio $T_{shock}/T_{structure}$. As may readily be seen in FIG. 20, when $T_{shock}/T_{structure}$ gets large, $W_{dynamic}/W_{static}$ becomes close to unity indicating quasi-static response. This quasi-static response is not affected by the damping conditions of the microstructure. In one version of the present invention, this phenomenon is utilized to design a switch that responds quasi-statically to shock loads. Such a switch is very robust and insensitive to variations in damping and packaging conditions, shock pulse profile, and shock duration.

If, on the other hand, a microstructure has a natural period $T_{structure}$ that is close or larger than the shock duration $T_{shock}$, the microstructure experiences the shock load as a dynamic fast varying load (essentially it experiences the shock as a "true shock", similar to the case in the macro and bigger world). Because of this dynamic experience, the ratio $W_{dynamic}/W_{static}$ is amplified, as shown in FIG. 20. This amplification of response can be used to design a microstructure that is more sensitive to shock. In the present invention, this dynamic experience by the structure is used to increase the sensitivity of the switch and to lower its activation threshold compared to quasi-static cases.

When a microstructure, for example, the MEMS switch 110 of the present invention, is subjected to a mechanical shock, the microstructure can experience the shock load as a quasi-static load that varies slowly over time. This occurs if the microstructure has a large natural frequency (resonance frequency). Under this condition the structure's natural period (the inverse of frequency) is small compared to the duration of the shock pulse.

In a larger structure, the shock is still a sudden force that acts over a short period of time. However, the microstructure experiences the shock as a slow force. In one embodiment of the present invention, this phenomenon is utilized to design a switch that responds quasi-statically to shock loads. Such a switch is typically insensitive to variations in damping and packaging conditions, shock pulse profiles, and shock durations.

If a microstructure, on the other hand, has a natural period that is close to or greater than the shock duration, it experiences the shock load as a fast varying load. In other words, a true shock is experiences, similar to that experienced by larger structures in the big world. The present invention utilizes this dynamic experienced by the structure to increase the sensitivity of the switch and to lower its activation threshold compared to quasi-static cases.

Figure 19:
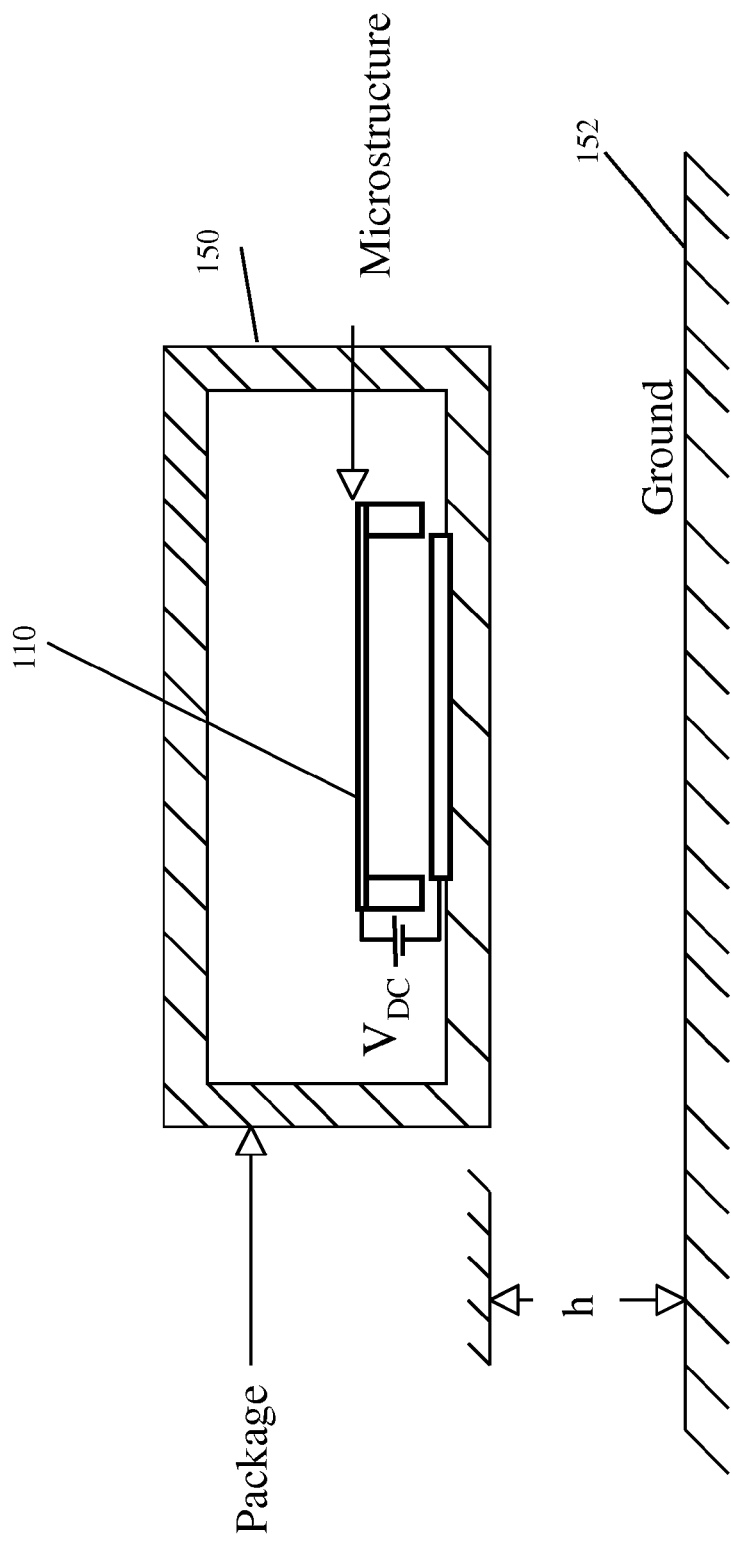
FIG. 19 is a cross-sectional, schematic view of a microstructure enclosed in a package.

The inventive switch 110 can be designed to be triggered by a shock force transmitted to the switch in the form of large acceleration acting over a short period of time. In the proposed use, the switch 110 is placed inside a package. Referring now also to FIG. 19, there is shown a cross-sectional, schematic view of a microstructure, for example, switch 110, in a package 150. Package 150, when desired, may be under vacuum to enhance the sensitivity of the switch 110. If the package 150 is subjected to a mechanical shock force, such as that due to an impact with ground 152 or a wall, not shown, an acceleration pulse is transmitted to the switch 110, particularly the movable element 104 of the switch 110. The movable element 104 responds to this level of acceleration by striking the other stationary element 102 underneath it to close or break an electric circuit. The level of acceleration that the switch 110 experiences in such situations can range from hundreds to thousands of gs depending on the level of impact and the nature of surfaces involved in the impact.

The inventive switch 110 can be tuned to operate at any desired acceleration level by modifying its design parameters, such as the structure shape, its dimensions, its clamping and mounting conditions, its material, the gap space between the movable element 104 and the stationary element, and the vacuum condition inside the package 150. In alternate embodiments, a proof or lumped mass may be added to the movable element 104 to enhance its sensitivity to acceleration.

Figure 5A:
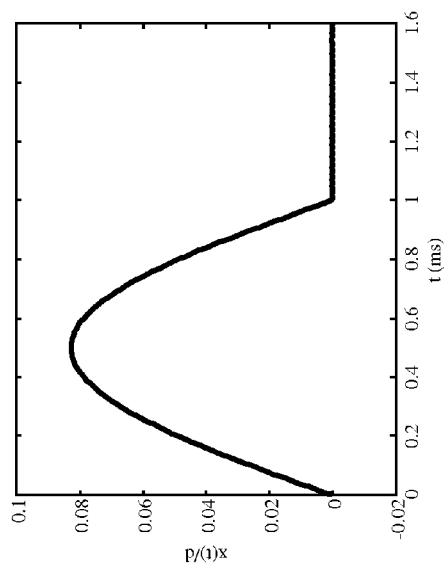
FIG. 5a is a plot of deflection vs. time of the movable element of the capacitor of FIG. 1 plate due to an applied acceleration pulse (shock force) with no bias voltage applied.
Figure 5B:
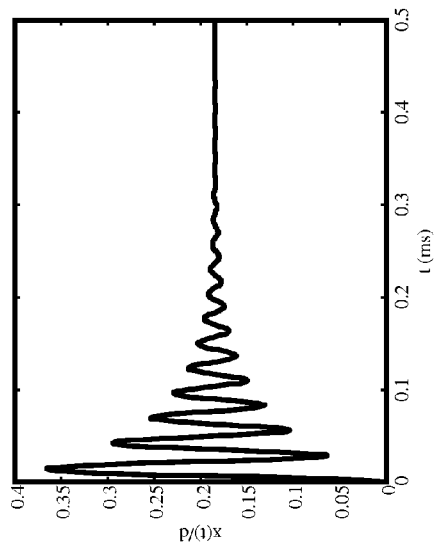
FIG. 5b is a plot of deflection vs. time of the movable element of the capacitor of FIG. 1 plate due to an applied step voltage load with no shock load.

Referring now to FIGS. 5a and 5b, there are shown graphs of deflection vs. time of movable plate 104 subjected to acceleration but no bias voltage, and bias voltage but no acceleration, respectively. In both FIGS. 5a and 5b, the deflection of movable plate 104 eventually finds a stable, non-collapsed equilibrium position.

Figure 6:
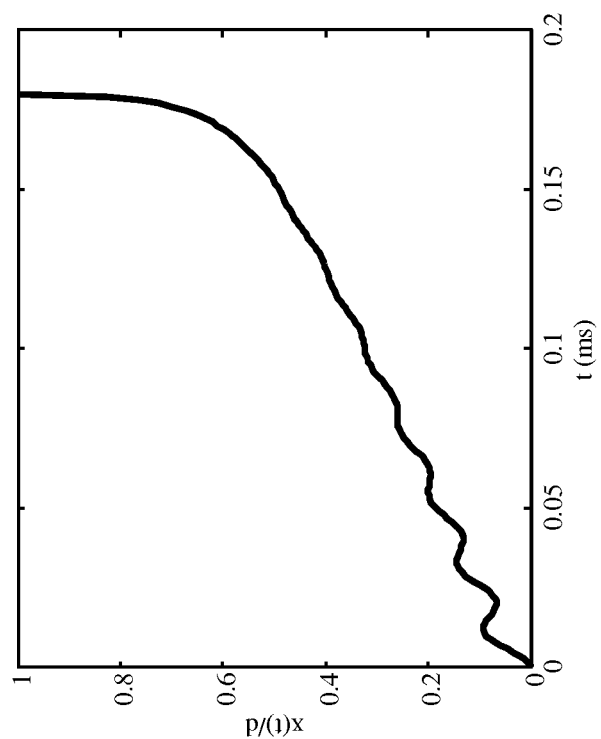
FIG. 6 is a plot of deflection vs. time of the movable element of the capacitor of FIG. 1 plate due to both an applied voltage and a shock load.

Referring now to FIG. 6, there is shown a deflection vs. time graph of movable plate 104 subjected to the combination of bias voltage and acceleration in accordance with the present invention. As may readily be seen, movable plate 104 collapses (i.e., pulls-in) when subjected to both a DC bias voltage-imposed electrostatic force and acceleration.

Accelerometers in accordance with the present invention, are "abused" when activated as a switch. That is, abused accelerometers are required to operate at greater than normal values of acceleration than are accelerometers of the prior art. The inventive devices are intentionally designed so that the movable plate 104 reaches pull-in (i.e., snaps down) beyond a specific desired threshold of acceleration. At accelerations below the design threshold, movable plate 104 acts as a normal accelerometer. However, at or beyond the acceleration threshold, movable plate 104 snaps down into stationary plate 102. This snapping down action may be utilized to make plates 102, 104 act as a smart switch that opens or closes an electrical circuit only upon detection of a specific, predetermined level of acceleration.

Figure 9:
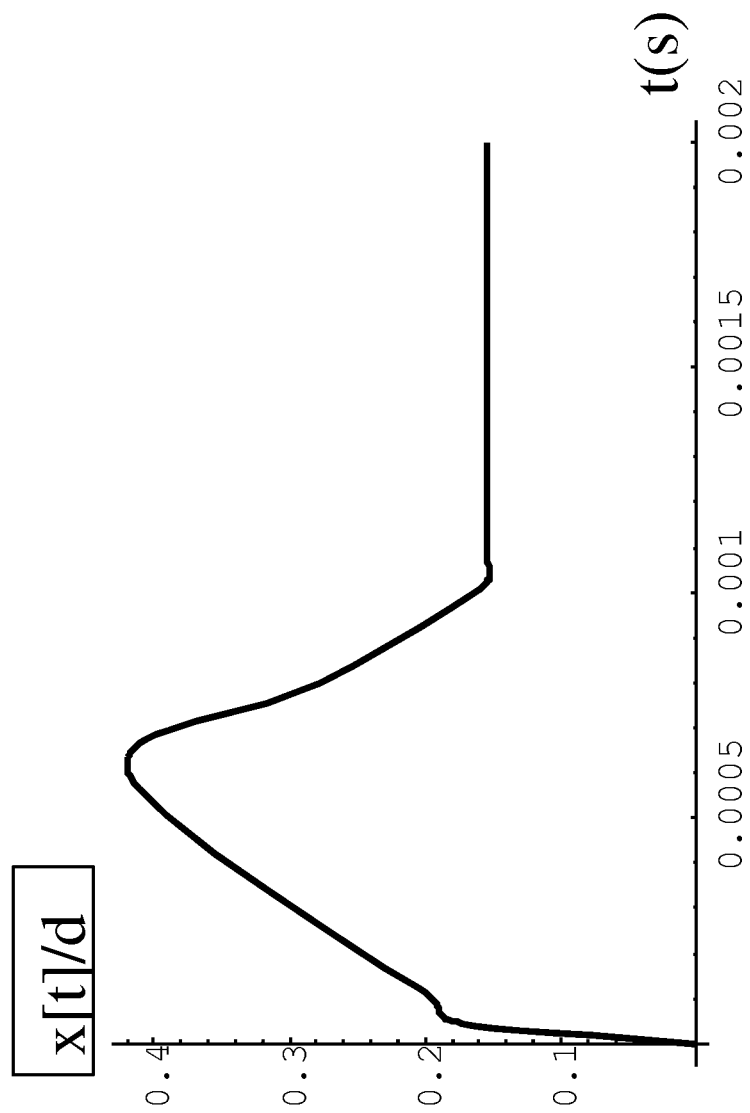
FIG. 9 is a plot of a time history of displacement of the movable element of an accelerometer/smart MEMS switch in accordance with the invention subjected to a load slightly below a desired acceleration threshold.

The inventive MEMS switch/accelerometer 110 is very sensitive to changes of acceleration. An accelerometer/smart MEMS switch in accordance with the invention is calibrated to an 84 g pull-in threshold. Referring now to FIG. 9, there is shown a plot of a time history of displacement of the movable element, (i.e., deflection vs. time) for example, movable plate 104 (FIG. 2b) when the device 110 is subjected to an acceleration of 83 g, a value just lower than the 84 g threshold. The plot shows a maximum normalized displacement x(t)/d near 0.4 (here x(t) is the plate maximum displacement and d is the gap spacing width between the capacitor plates 102, 104 (FIG. 2).

Figure 10:
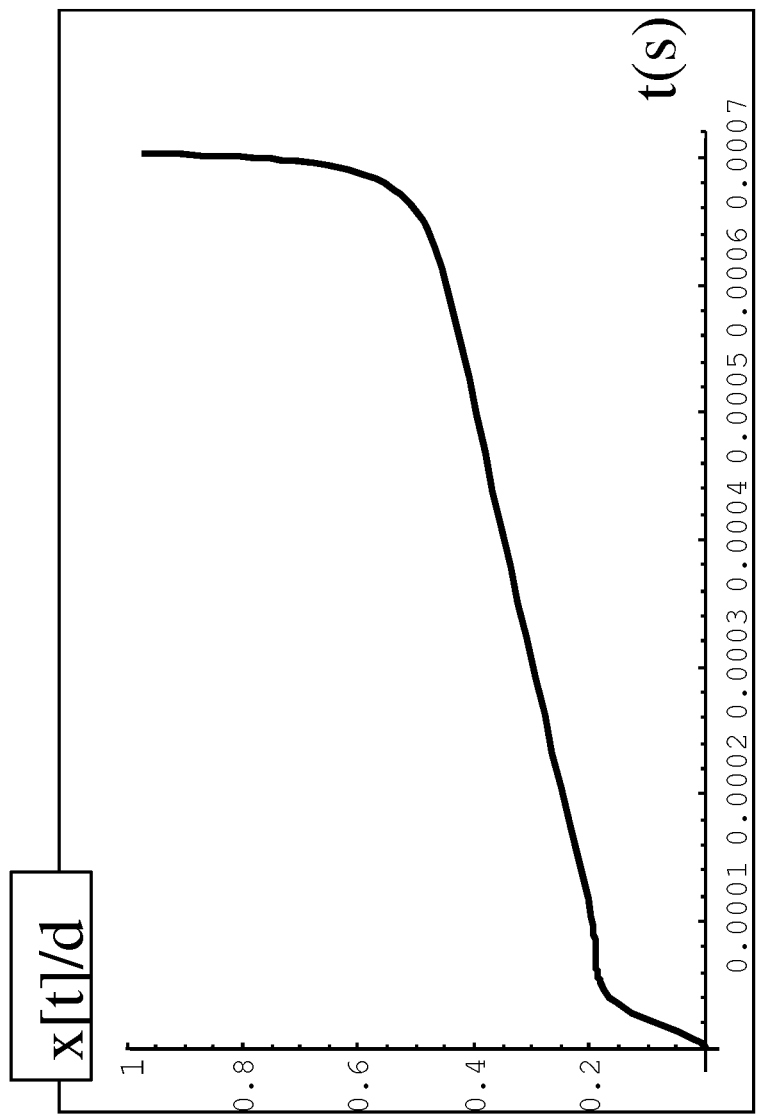
FIG. 10 is a plot of a time history of displacement of the movable element of an accelerometer/smart MEMS switch in accordance with the invention subjected to a load at a desired acceleration threshold.

FIG. 10 is a plot similar to that of FIG. 9 showing the time history of the plate response when the device is subjected to an acceleration of 84 g, the desired threshold of acceleration. The plot shows a maximum normalized displacement x(t)/d near 1 (unity) indicating that the plate 104 has impacted the stationary element 102 as intended. Movable plate 104 does not return to a pre-acceleration equilibrium position.

Figure 11:
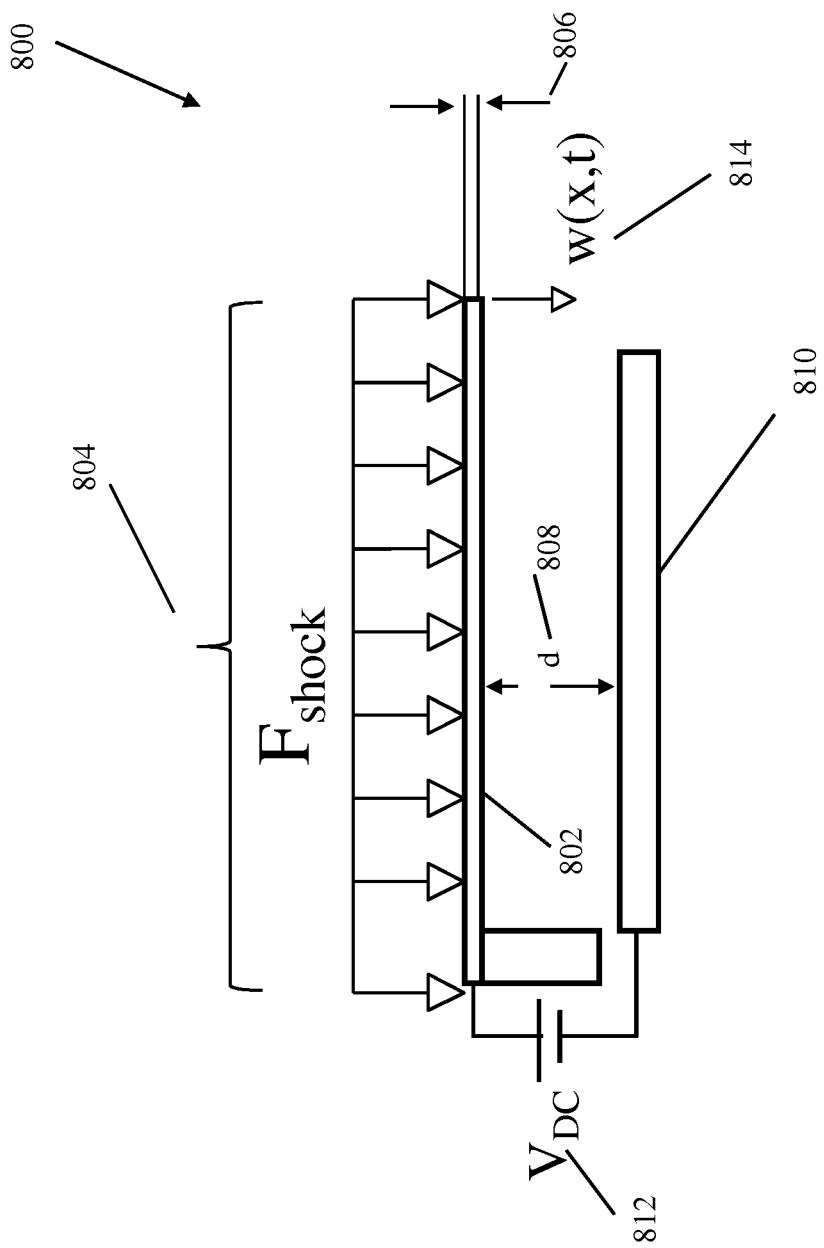
FIG. 11 is a schematic representation of an acceleration or shock-actuated MEMS switch wherein the moving element is a cantilever microbeam.

A specific microstructure useful for implementing the MEMS switch of the invention is now provided. Referring now to FIG. 11, there is shown a schematic representation of an acceleration or shock-actuated MEMS switch wherein the moving element is a cantilever beam, generally shown at reference number 800. A cantilever microbeam 802 is, for example, made of silicon, has a length 804 of approximately 110 microns, width, not shown, of approximately 10 microns, and thickness 806 of approximately 0.1 micron. The gap spacing d 808 between beam 802 and a substrate 810 (i.e., the lower stationary electrode) is approximately 2 microns.

Microbeam 802 is placed in near vacuum conditions to avoid mechanical damping from the surrounding air. The natural oscillation period of microbeam 802 is approximately 0.1 ms.

Figure 12:
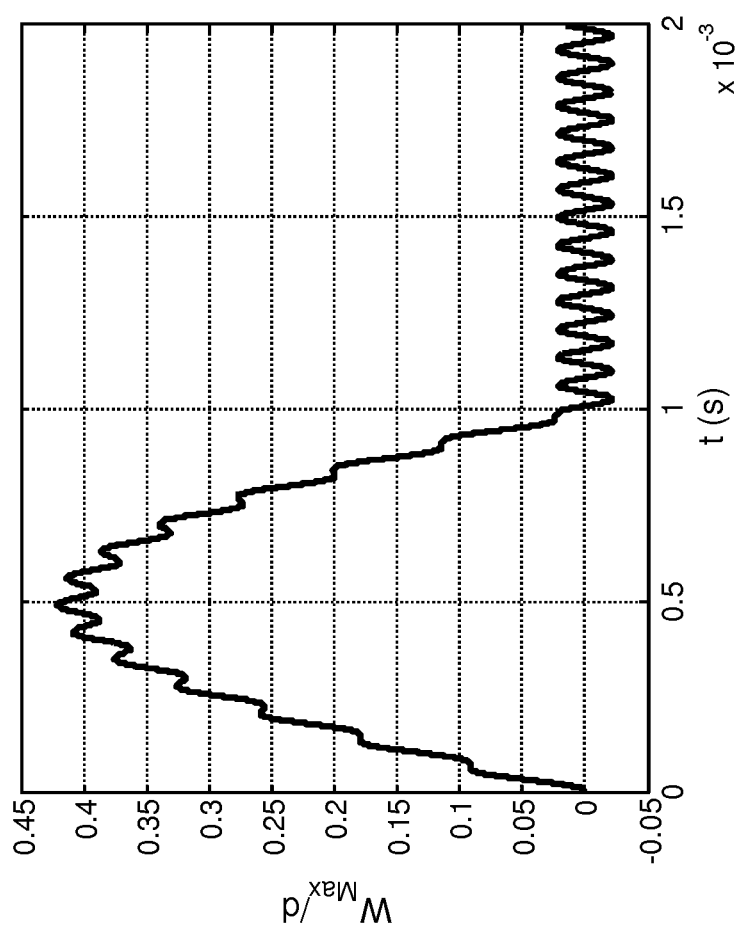
FIG. 12 shows the tip deflection of the microbeam of the MEMS switch of FIG. 11 in response to a half-sine shock pulse of 1 ms duration.

When microbeam 802 is subjected to a half-sine shock load with approximately a 1 ms duration and an amplitude of approximately 400 g in the absence of an applied bias voltage (i.e., $V_{DC}$=0), the response of microbeam 802 is shown in FIG. 12.

FIG. 12 shows the tip deflection $W_{max}$,t) 814 of the microbeam 802 normalized to the gap width d 808 versus time t. Since the shock duration (1 ms) is ten times the natural period of the microbeam 802, microbeam 802 experiences the shock as a quasi-static load. Hence, it may be seen in FIG. 12 that the time response of microbeam 802 has a similar shape to that of the applied half-sine pulse.

Figure 13:
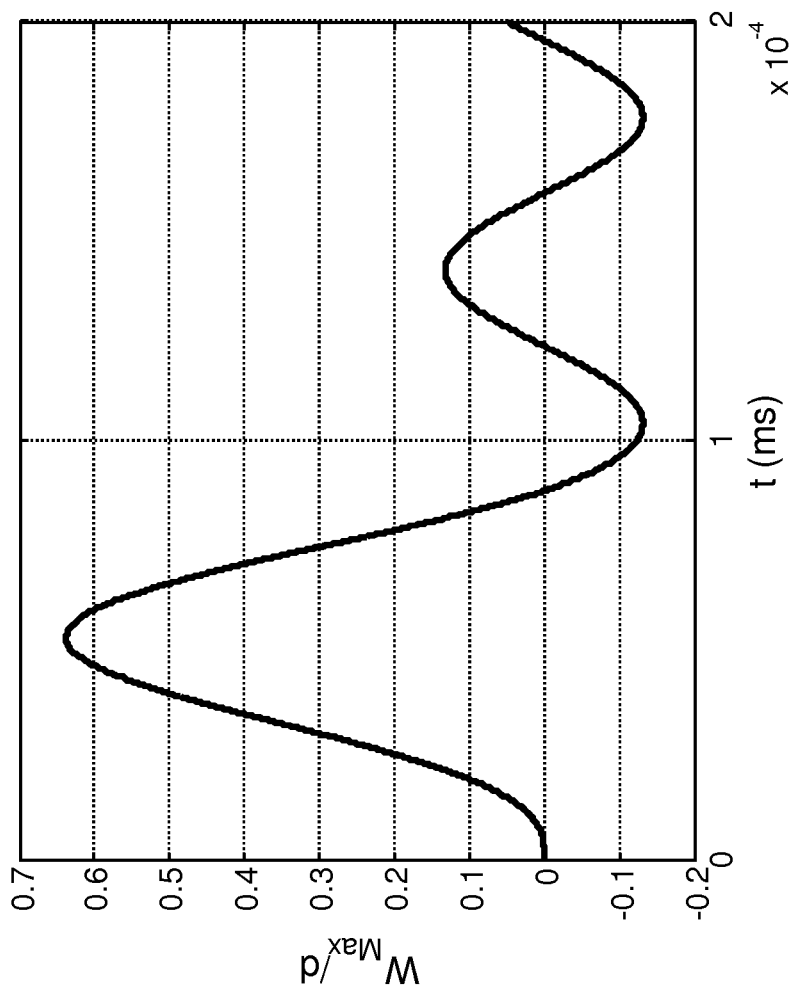
FIG. 13 is a time response of the cantilever microbeam of the MEMS switch of FIG. 11 in response to a half-sine shock pulse of 0.1 ms duration.

Referring to FIG. 13, there is shown the time response of microbeam 802 subjected to a similar shock pulse but wherein the pulse duration is 0.1 ms. In other words, the applied pulse duration is approximately equal to the natural period of microbeam 802. FIG. 13, however, shows a dynamic response in contrast to the quasi-static response of FIG. 12. It may readily be seen that the maximum deflection of the microbeam 802, approximately 0.65 W/d, is larger than the maximum deflection, approximately 0.43 W/d, of quasi-static response seen in FIG. 12. This indicates that the sensitivity of a MEMS switch can be increased by designing its mechanical structure to have a natural period close to the duration of the expected shock force.

MEMS switch 800 which may act as a trigger may be made tunable switch by applying DC bias voltage 812 between the cantilever microbeam 802 and substrate 810. By varying the voltage 810, the switch may be tuned to cause microbeam 802 to impact substrate 810 (i.e., pull-in) at a desired level of shock load to close or break an electric circuit, not shown.

Figure 14A:
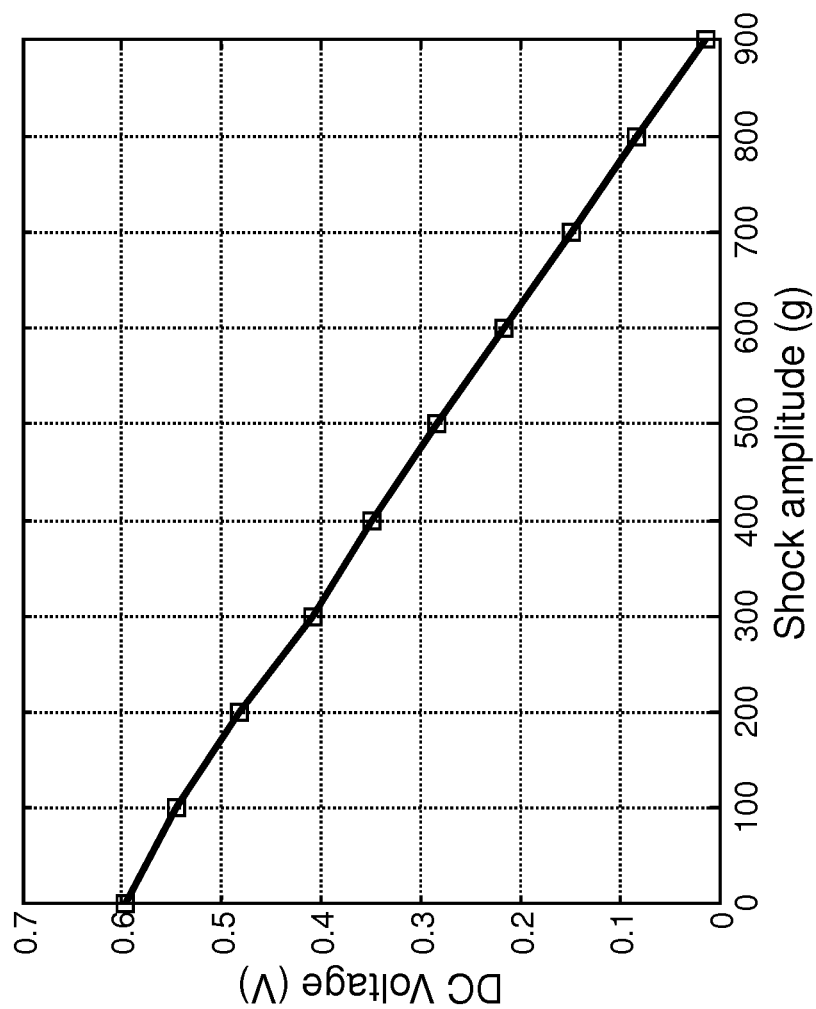
FIGS. 14a and 14b are plots of DC voltage threshold vs. shock amplitude of the MEMS switch of FIGS. 12 and 13, respectively, having half-sine shock pulses of durations equal to 1 ms and 0.1 ms, respectively.
Figure 14B:
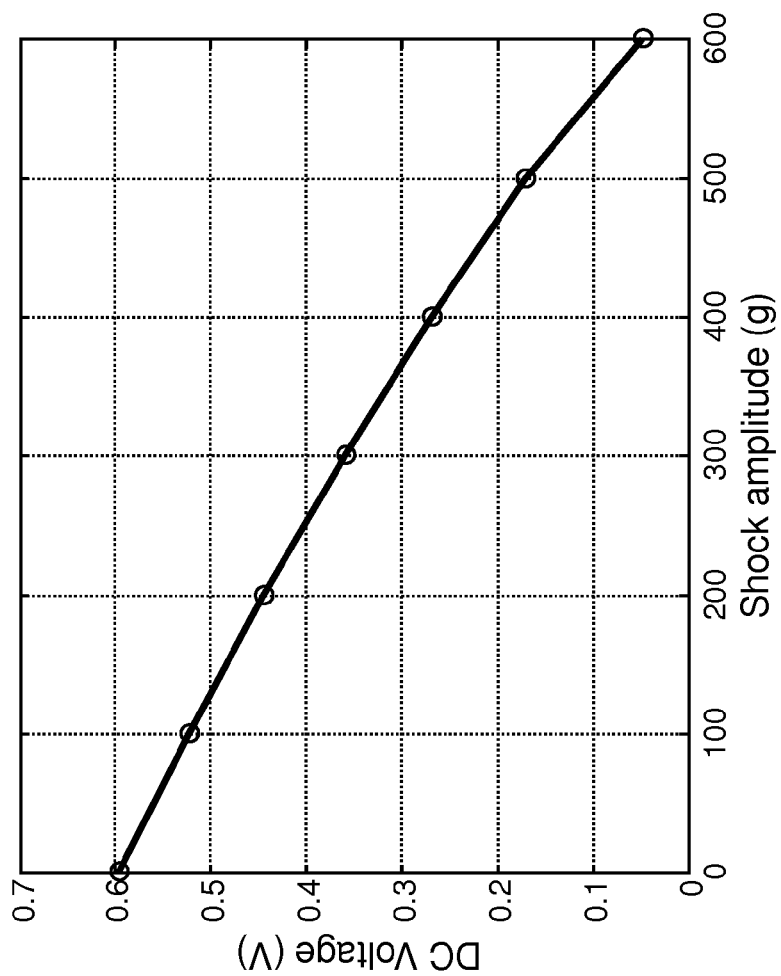

Referring now to FIGS. 14a and 14b, there are shown plots of DC voltage threshold vs. shock amplitude for a half-sine shock pulse of duration 1 ms (i.e., a quasi-static case) and 0.1 ms (i.e., a dynamic loading case), respectively. In each case, as may be seen, the shock amplitude at which microbeam 802 (FIG. 11) impacts substrate 810 may be controlled by varying the DC voltage 812. By comparing FIGS. 14a and 14b, it may be seen that the range of acceleration that triggers the switch 800 is lower for the case of dynamic load (FIG. 14b).

FIGS. 14a and 14b demonstrate a tunable switch with an operational range of hundreds of gs. Some applications, however, require that the MEMS switch 800 be triggered at lower acceleration levels. In such applications, the MEMS switch 800 and its package may not be subjected to a shock force. Shock forces typically induce large values of acceleration. For example, in an application such as protecting a portable device (e.g., a laptop computer), when falling the MEMS switch must function once it detects free falling, which induces an acceleration of one g. If the laptop hits the ground, it is too late to protect the hard drive. So it is desired that the switch 800 be triggered at a level of one g before impact.

Figure 15:
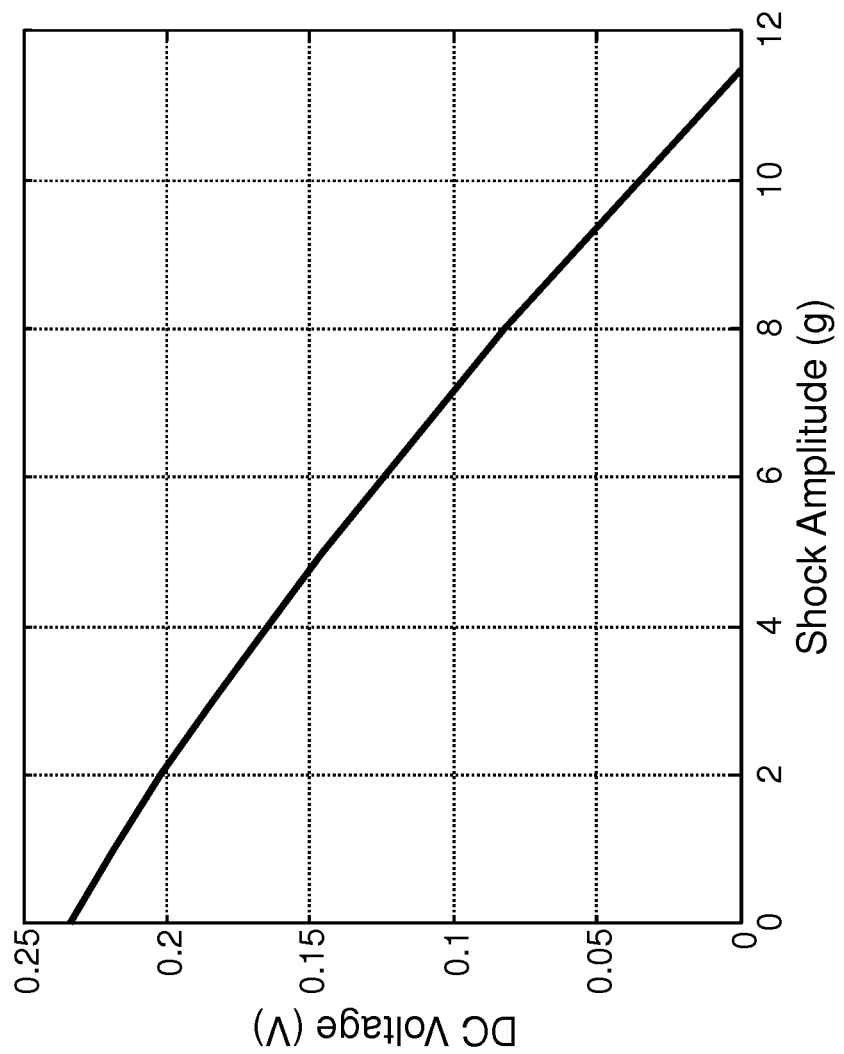
FIG. 15 is a plot of DC voltage threshold vs. shock amplitude for a cantilever microbeam having a geometry different than that of FIGS. 14a, 14b, a5 and 16, subjected to a half-sine shock pulse having a duration of approximately 1 ms.

To lower the operating range of the switch 800, the geometry of the microbeam may be modified compared to microbeam 802 of the MEMS switch of FIG. 11. By choosing a microbeam having a length of approximately 900 microns, a width of approximately 100 microns, and a thickness of approximately 1 micron, the trigger acceleration level is significantly lowered Referring now to FIG. 15, there is shown a plot of DC voltage threshold vs. shock amplitude for a half-sine shock pulse having a duration of approximately 1 ms. FIG. 15 corresponds to FIG. 14 for the microbeam 802 of FIG. 11 except that by modifying the microbeam dimensions the operation range of the switch has been reduced significantly to a maximum of 12 g. The switch 800 is more sensitive to variation in acceleration in this lower range.

The sensitivity of a MEMS switch 800 having a beam 802 with the modified dimensions to variations in the DC bias voltage and the acceleration level is now shown. For example, a desired threshold for the switch closing (i.e., the MEMS switch pulling in) is chosen to be an acceleration level of 4 g or greater. As may be seen in FIG. 15, a DC bias voltage of approximately 0.17 V must be applied between the microbeam and its substrate to create a pull-in at 4 g.

Figure 16:
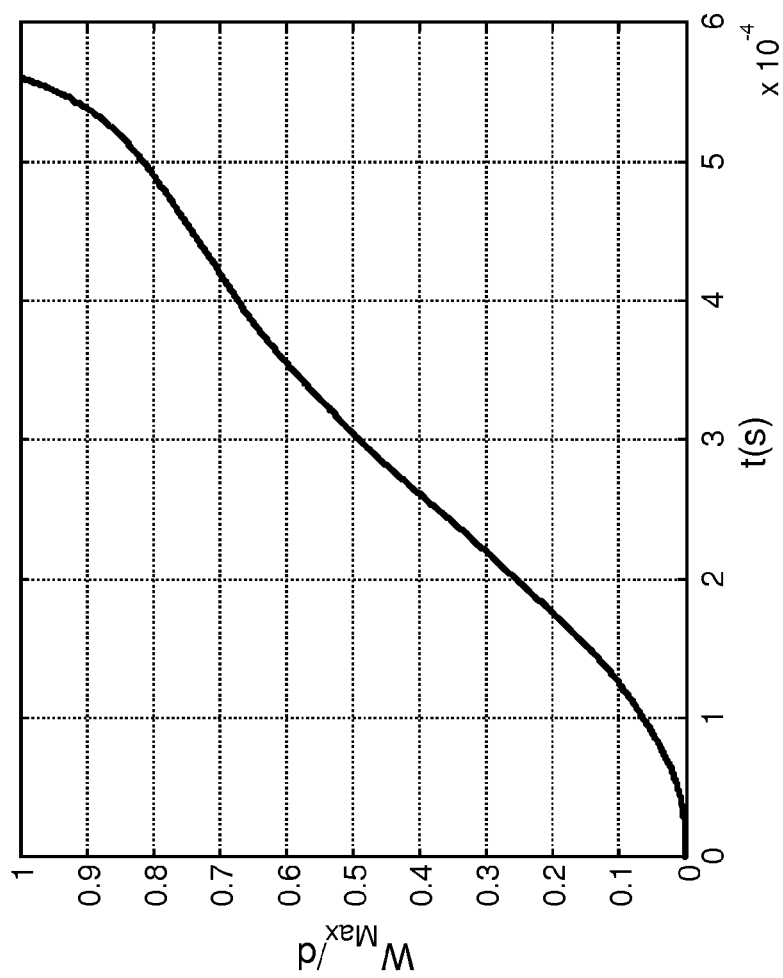
FIG. 16 is a plot of time response of the microbeam of the MEMS switch of FIG. 15 when biased by 0.17 V and subjected to a shock pulse of amplitude 4 g.

Referring now also to FIG. 16, there is shown the time response of the microbeam when biased by 0.17 V and subjected to a shock pulse of amplitude 4 g. As may be seem in FIG. 16, the microbeam impacts the substrate closing the switch when $W_{max}$/d=1.

Figure 17:
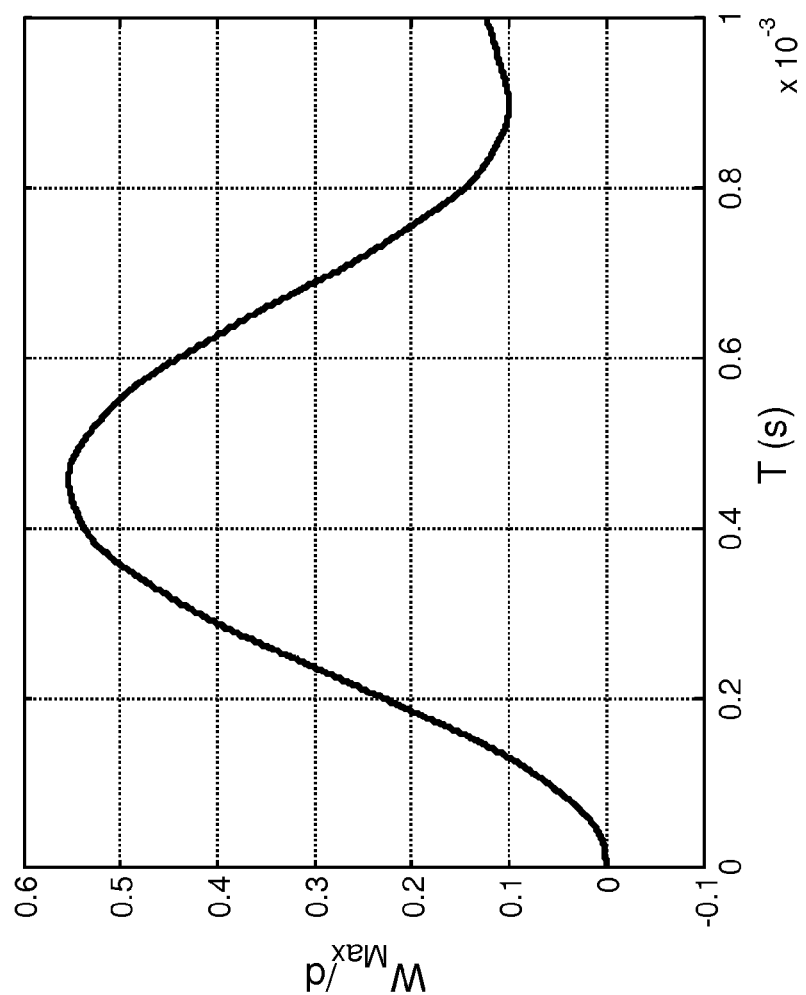
FIG. 17 shows a plot similar to that of FIG. 16, but with the DC bias voltage set to 0.16 V and wherein the MEMS switch does not close when subjected to a 4 g acceleration.

FIG. 17 shows a plot similar to that of FIG. 15, but with the DC bias voltage set to 0.16 V. As may readily be seen in FIG. 17, the MEMS switch does not close when subjected to a 4 g acceleration.

Figure 18:
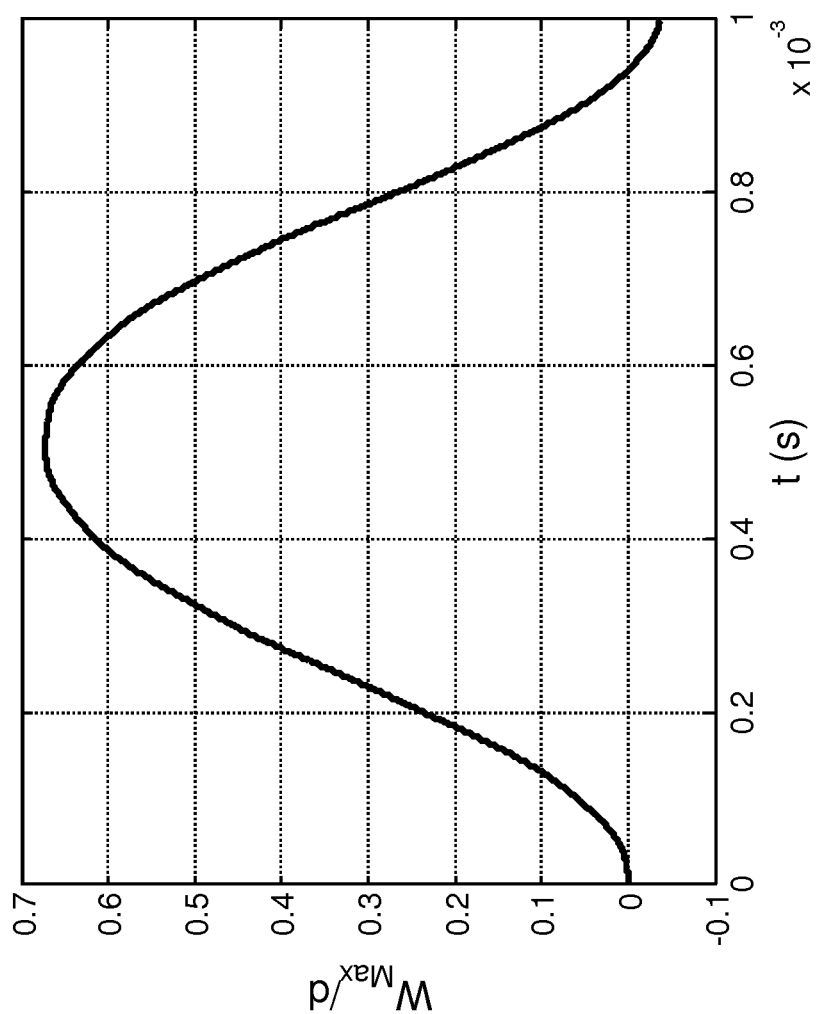
FIG. 18 is a plot similar to FIG. 16, but with the level of acceleration reduced to 3 g.

FIG. 18 shows a plot similar to FIG. 16, but with the level of acceleration reduced to 3 g. It should also be noted that the MEMS switch does not close (i.e., pull in) but remains in the off position. It may be concluded from FIGS. 16-18 that the inventive MEMS switch can be accurately tuned to close at a predetermined, desired acceleration level. As may be seen in FIG. 18, below the desired threshold of acceleration, the switch does not close. Also, as may be seen in FIG. 18, reducing the voltage bias prevents the MEMS switch from closing.

Accelerometers/smart MEMS switch devices in accordance with the invention exhibit distinctive and strong responses at accelerations beyond their desired acceleration thresholds. However, below the desired acceleration thresholds, the plates deflect by small magnitude. As shown in FIG. 17, the normalized deflection is approximately 0.4. Above the desired acceleration threshold, the plate 104 deflects by large magnitudes until it impacts the fixed element 102.

For example, as shown in FIG. 18, the deflection is 1.0. Hence, the switch 110 produces a clear and strong signal that is less sensitive to noise than devices of the prior art.

An illustrative application for the inventive device is for an air bag sensor/activator for motor vehicles. In sensor/activation mechanisms of the prior art, an accelerometer monitors the car acceleration and sends its output signal to a decision/controller unit. If the car experiences a sharp deceleration due to a collision, the decision unit sends a signal to a switch which, in turn, deploys the air bag. This complex system requires at least three distinct components: the accelerometer, the decision/controller unit, and a switch to deploy the air bag activated upon command from the decision/controller unit.

A system built around the inventive sensor, however, requires no additional components; the MEMS smart switch formed by the snapped-down movable plate creates the necessary electrical connection to fire the air bags directly. The smart switch must be constructed and calibrated to fire the air bag only at the desired acceleration g force level.

It will be recognized that the inventive accelerometer/smart switch may be used in many other applications. For example, modern notebook computers may incorporate the inventive device to lock down the heads of a hard disk drive when an acceleration is caused by the computer falling off a surface. The concept may be extended to cell phones, PDAs, digital cameras, and other similar portable electronic devices, to perform a safety shutdown or evasive function upon detecting a predetermined acceleration value.

In weapons systems (e.g., missiles), the inventive device may be used to arm, disarm, or fire the weapon upon striking or missing its target.

The inventive accelerometer/MEMS smart switch is highly advantageous in that it is easy to both fabricate and operate. It has low power consumption and can be fabricated and calibrated to act like a switch that operates beyond a specific level of acceleration. Consequently, the inventive accelerometer/smart MEMS switch can inexpensively replace existing complex and/or expensive systems employing sensing and actuating mechanisms.

Figure 7:
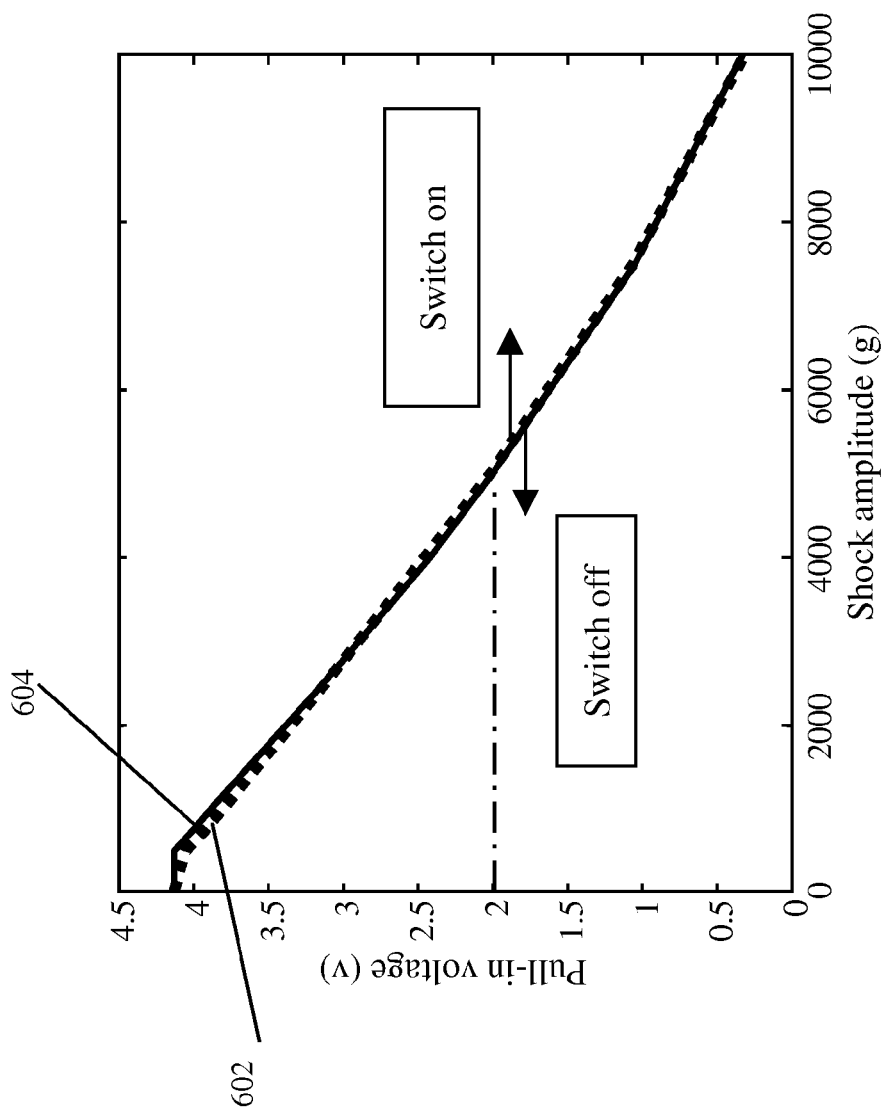
FIG. 7 is a plot of the actuation threshold of the device of the present invention as a function of shock amplitude expressed in gs.

The devices may be designed to be insensitive to changing damping conditions. This is the case when the moving structure is designed to have a high natural frequency, and hence a short natural period compared to shock duration. Therefore, the structure responds quasi-statically. Referring now to FIG. 7, there is shown a plot of an activation threshold vs. the shock amplitude of an acceleration pulse. Two plots, 602 and 604, represent, respectively, damping of approximately 0.05 and 0.7. As may be seen, there is very little difference in the response of the moving member to pull-in voltage even across this wide range of damping (relatively low to high). Accordingly, relatively low-cost packaging techniques may be used. MEMS devices typically must be well sealed and in near vacuum. As shown in FIG. 7, this requirement is now unnecessary.

Figure 8:
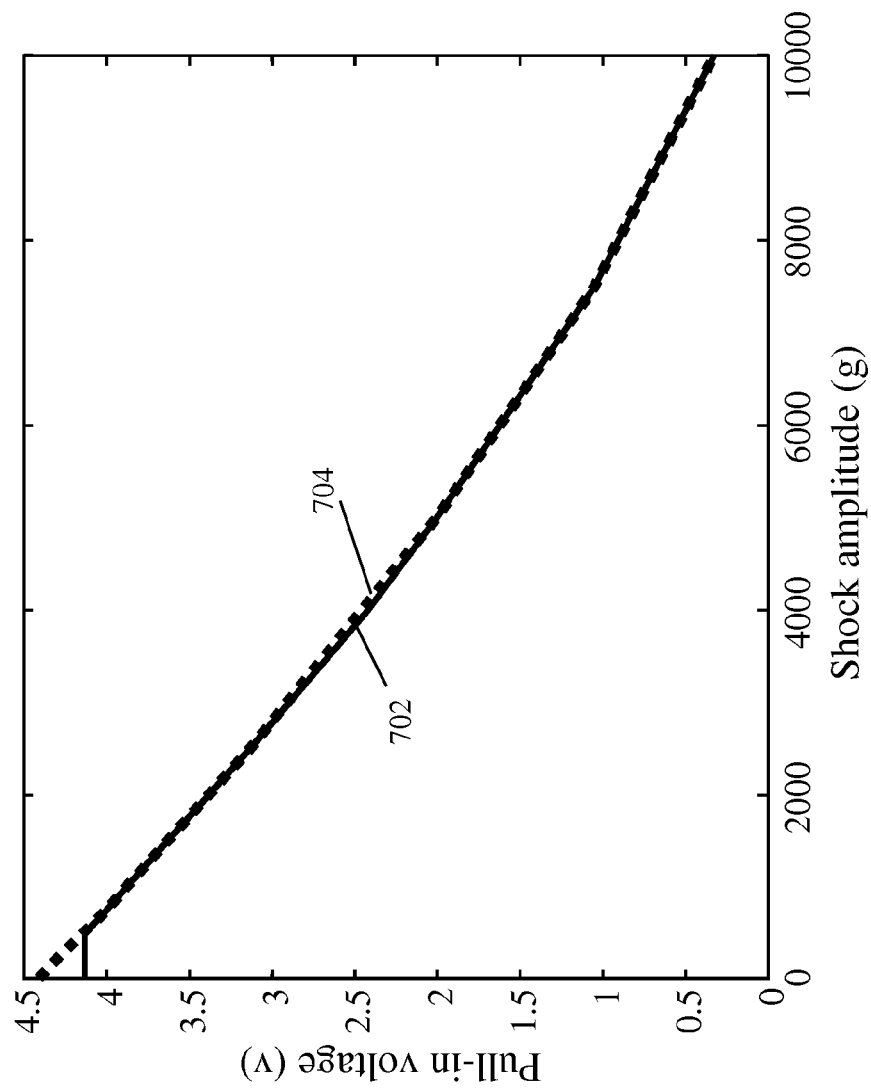
FIG. 8 is a plot of the actuation threshold of the MEMS switch of the invention vs. shock amplitude for shock durations of 1.0 ms and 0.1 ms.

Also, the accelerometer/smart MEMS switch 110 of the invention can be insensitive to the duration of the acceleration pulse, also called shock. Referring now to FIG. 8, there is shown a plot of the actuation threshold of the device of the present invention as a function of shock amplitude expressed in gs. Plots 702, 704 show shock pulse durations of 1.0 ms and 0.1 ms, respectively. As may readily be seen, plots 702, 704 are substantially coincident across a large portion of the operating range of the inventive device. These insensitivities to both damping (FIG. 7) and shock pulse duration (FIG. 8) enhance the reliability of the inventive device.

The accelerometer/smart MEMS switch 110 of the invention is also easy to calibrate so that snap down may be triggered across a wide range of accelerations. As may be seen, for example, in FIGS. 7 and 8, accelerations in an operational range from approximately a few hundred gs to 10,000 g are shown. Since the inventive MEMS switch 110 may be designed to operate in a range between approximately zero g and hundreds of thousands of gs, the invention is not limited to MEMS switches having any particular g-force operating value. Calibration may be achieved by modifying the geometry of the plate 104 and its boundary conditions (e.g., clamped, free, etc.) and by changing the applied DC bias voltage. One example is provided by changing the geometry of FIGS. 14a and 15.

While the microstructure of the present invention is designed to function without need for pre-stressing the movable element, it will be recognized that similar structure using a pre-stressed movable element could be constructed. Consequently, the invention includes device having either unstressed or pre-stressed moving elements.

Since other modifications and changes varied to fit particular operating requirements and environments will be apparent to those skilled in the art, this invention is not considered limited to the examples chosen for purposes of this disclosure, and covers all changes and modifications which does not constitute departures from the true spirit and scope of this invention.

Having thus described the invention, what is desired to be protected by Letters Patent is presented in the subsequently appended claims.

What is claimed is:

1. A micro-electro-mechanical shock sensing system (MEMS), comprising:
   a resonant micro-electro-mechanical structure configured to have a free state and a pull in state, and having a first electrode configured to interact with an electric field;
   a second electrode spaced from the resonant micro-electro-mechanical structure in the free state, configured to generate the electric field, to apply an electrostatic force on the resonant micro-electro-mechanical structure in the free state, and to form a conductive path together with the first electrode in the pull in state, wherein the spacing of the resonant micro-electro-mechanical structure from the electrode is responsive to at least a mechanical acceleration along an axis; and
   an electrical bias generator configured to selectively apply a voltage potential between the first electrode and the second electrode to generate the electrostatic force, to detect formation of the conductive path upon contact of the first and second electrodes and to detect the mechanical acceleration along the axis based on a capacitance of the first and second electrodes,
   said resonant micro-electro-mechanical structure being selectively responsive to a shock pulse in the mechanical acceleration having a peak amplitude along the axis to transition from the free state to the pull in state wherein a steady state mechanical acceleration along the axis of the peak amplitude as the peak amplitude of the shock pulse does not cause the transition from the free state to the pull in state.

2. The MEMS according to claim 1, wherein the resonant micro-electro-mechanical structure comprises a structure selected from group consisting of: a plate, a beam, a shell, a lumped mass, and a diaphragm.

3. The MEMS according to claim 1, wherein the resonant micro-electro-mechanical structure comprises a silicon cantilever microbeam.

4. The MEMS according to claim 1, wherein a magnitude of the mechanical acceleration along the axis that results in a transition to the pull in state is selectively dependent on at least a predetermined stiffness of the resonant micro-electro-mechanical structure.

5. The MEMS according to claim 4, wherein a magnitude of the mechanical acceleration along the axis that results in a transition to the pull in state is further selectively dependent on the voltage potential.

6. The MEMS according to claim 5, wherein the voltage potential comprises an AC voltage superimposed on a DC voltage.

7. The MEMS according to claim 5, wherein the electrical bias generator is further configured to control a magnitude of the mechanical acceleration along the axis that results in a transition from the free state to the pull in state.

8. The MEMS according to claim 1, the micro-electro-mechanical structure is supported at fixed position by one end, the other end being configured for resonant motion.

9. The MEMS according to claim 1, wherein the electrical bias generator is further configured to control the voltage potential to calibrate the peak amplitude of the mechanical acceleration which causes the transition from the free state to the pull in state.

10. The MEMS according to claim 1, wherein the peak amplitude of the mechanical acceleration which causes the transition from the free state to the pull in state is insensitive to variations in a damping of the micro-electro-mechanical structure.

11. The MEMS according to claim 1, wherein the micro-electro-mechanical structure is configured to exhibit a dynamic response to a shock.

12. The MEMS switch according to claim 1, further comprising a housing configured to maintain the micro-electro-mechanical structure and electrode under vacuum.

13. A method of using a micro-electro-mechanical system (MEMS), comprising:
   providing a resonant micro-electro-mechanical structure configured to have a free state and a pull in state, and an electrode spaced from the resonant micro-electro-mechanical structure in the free state;
   applying an electrostatic force on the resonant micro-electro-mechanical structure in the free state;
   subjecting the resonant micro-electro-mechanical structure to a mechanical acceleration along an axis, to selectively cause a transition to the pull in state and to form a conductive path between the resonant micro-electro-mechanical structure and the electrode under conditions of a shock pulse having a peak amplitude and remain in the free state under mechanical acceleration along the axis at the peak amplitude, wherein a spacing of the resonant micro-electro-mechanical structure from the electrode is responsive to at least a magnitude and a duration of a mechanical acceleration along at least one axis; and
   measuring the mechanical acceleration along the at last one axis based on a capacitance of the resonant micro-electro-mechanical structure and the electrode in the free state.

14. The method according to claim 13, wherein the resonant micro-electro-mechanical structure comprises a silicon cantilever microbeam within a vacuum enclosure.

15. The method according to claim 13, wherein the electrostatic force is applied by an electrical signal having an AC voltage superimposed on a DC voltage.

16. The method according to claim 15, wherein the DC voltage is selectively controlled to alter a magnitude of the peak amplitude of the mechanical acceleration along the axis which causes a transition to the pull in state.

17. The method according to claim 16, further comprising calibrating the electrostatic force to control the peak amplitude which causes a transition to the pull in state from the free state.

18. The method according to claim 13, further comprising generating a continuous signal representative of an instantaneous mechanical acceleration along the axis.

19. The method according to claim 13, further comprising deploying an automotive airbag in dependence on the transition to the pull in state.

20. A method for operating a MEMS device, comprising:
   providing a micro-electro-mechanical structure comprising a first electrode and a structure having a resonant free state and a pull in state, disposed in an operative relationship with an electrode;
   applying an oscillating electrostatic force between the first electrode and the second electrode while measuring a capacitance therebetween, wherein the electrostatic force is sufficient under a peak shock having a sufficient mechanical acceleration amplitude, a pull in condition occurs, while under steady state conditions of the sufficient mechanical acceleration amplitude, the resonant free state is maintained;
   calibrating the electrostatic force to achieve the pull in condition by altering an oscillating drive voltage for the first electrode and the second electrode; and
   selectively producing a signal indicative of the pull in state after subjecting the micro-electro-mechanical structure to the peak shock having the sufficient mechanical acceleration amplitude which causes a transition to the pull in state.

* * * * *